Figure 6:
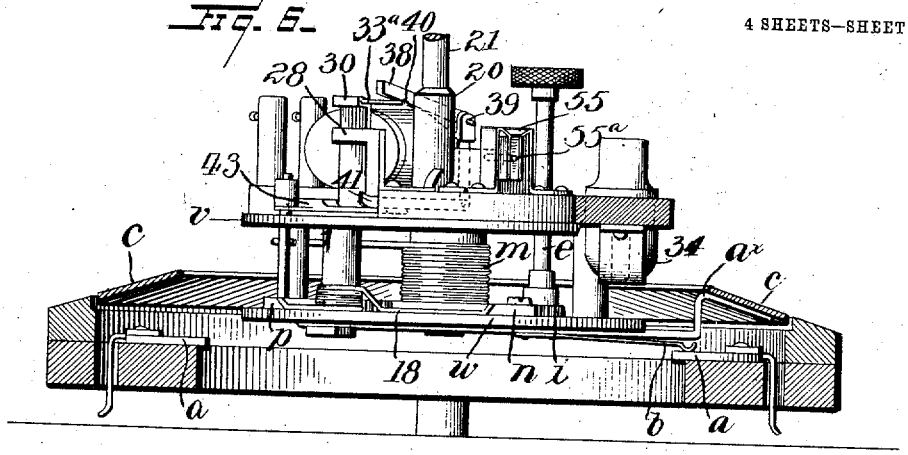

No. 12,240. REISSUED JULY 19, 1904.
A. K. ANDRIANO & H. HERBSTRITT.
INDIVIDUAL TELEPHONE SWITCH AND LOCK-OUT MECHANISM FOR INTERCONNECTING LINES.
APPLICATION FILED JUNE 15, 1904.
4 SHEETS—SHEET 1.
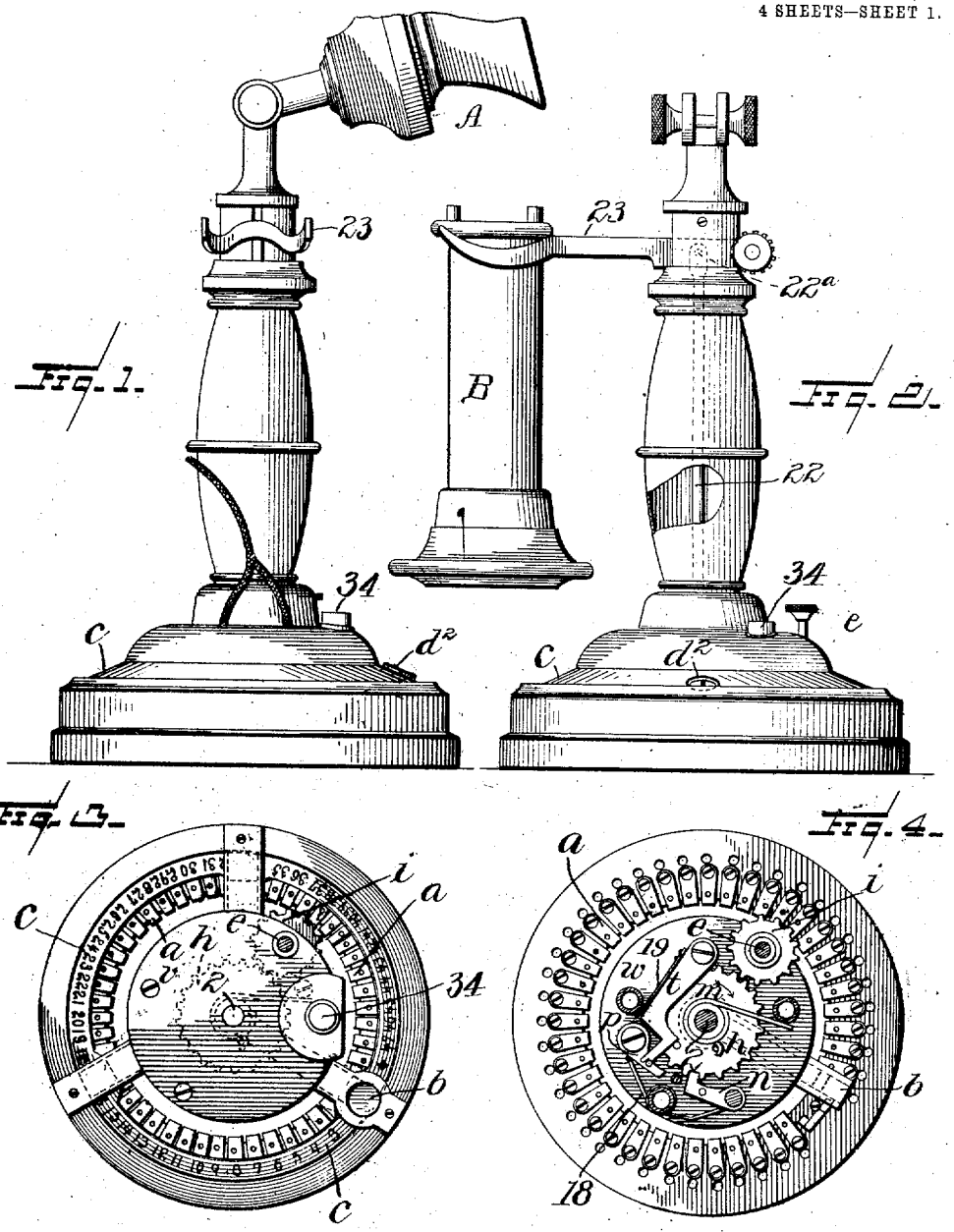
WITNESSES:
W. F. Doyle.
Geo. B. Pitts.
INVENTORS:
Albert Koch Andriano &
Hermann Herbstritt.
BY J. S. Backer,
Asso. Attorney No. 12,240. REISSUED JULY 19, 1904.

A. K. ANDRIANO & H. HERBSTRITT.

INDIVIDUAL TELEPHONE SWITCH AND LOCK-OUT MECHANISM FOR INTERCONNECTING LINES.

APPLICATION FILED JUNE 15, 1904.

4 SHEETS—SHEET 2.

WITNESSES:
Geo. B. Pitts.

INVENTORS:
Albert Koch Andriano
Hermann Herbstritt.
BY G. S. Basker
Asso. Attorney No. 12,240. REISSUED JULY 19, 1904.

A. K. ANDRIANO & H. HERBSTRITT.

INDIVIDUAL TELEPHONE SWITCH AND LOCK-OUT MECHANISM FOR INTERCONNECTING LINES.

APPLICATION FILED JUNE 15, 1904.

4 SHEETS—SHEET 3.

WITNESSES:

W. F. Ft. Koyle.

Geo. B. Pitts.

INVENTORS

Albert Koch Andriano

Hermann Herbstritt

BY G. S. Barker

Asso. Attorney

No. 12,240. REISSUED JULY 19, 1904.

A. K. ANDRIANO & H. HERBSTRITT.

INDIVIDUAL TELEPHONE SWITCH AND LOCK-OUT MECHANISM FOR INTERCONNECTING LINES.

APPLICATION FILED JUNE 15, 1904.

4 SHEETS—SHEET 4.

Witnesses.
Arthur L. Shea
M. Regner

Inventors
Albert Hook Andriano,
and Hermann Herbstritt
by J. S. Parker
their Attorney No. 12,240. Reissued July 19, 1904.

UNITED STATES PATENT OFFICE.

ALBERT KOCH ANDRIANO, OF SAN FRANCISCO, CALIFORNIA, AND HERMANN HERBSTRITT, OF NEW YORK, N. Y., ASSIGNORS, BY MESNE ASSIGNMENTS, TO THE DIRECT-LINE GENERAL TELEPHONE COMPANY, OF SAN FRANCISCO, CALIFORNIA, A CORPORATION OF CALIFORNIA.

INDIVIDUAL TELEPHONE-SWITCH AND LOCK-OUT MECHANISM FOR INTERCONNECTING LINES.

SPECIFICATION forming part of Reissued Letters Patent No. 12,240, dated July 19, 1904.

Original No. 691,229, dated January 14, 1902. Application for reissue filed June 15, 1904. Serial No. 212,735.

*To all whom it may concern:*

Be it known that we, ALBERT KOCH ANDRIANO, a citizen of the United States, residing in the city and county of San Francisco, State of California, and HERMANN HERBSTRITT, a subject of the Emperor of Germany, residing in the city and county of New York and State of New York, have invented new and useful Improvements in Individual Telephone-Switch and Lock-Out Mechanism for Interconnecting Lines, of which the following is a specification.

This invention relates to improvements made in switch devices of the class or description that are adapted to give individual connection between the stations without the assistance of a central office and an operator. These improvements consist in switching mechanism of novel construction in which provision is made for locking the movable contact and preventing it from being moved after the receiver has been taken down for use, also in novel locking-out means controlling the local or primary circuit at each station and holding the same disconnected from the main line, so that the local circuit of the station cannot get on the line of another station that is already in use.

The invention includes also certain novel construction and combination of portable switch-stand, switching device, and locking-out mechanism, as hereinafter fully described, and pointed out in the claims at the end of this specification.

The object of these improvements is mainly to prevent a person at a station from getting on the line and listening to the conversation taking place between two other connected stations. The novel features and the general construction and combination thereof to produce an improved portable desk-telephone and switch-stand are explained at length in the following description, in which reference is had to the accompanying drawings, forming part thereof.

Figure 5:
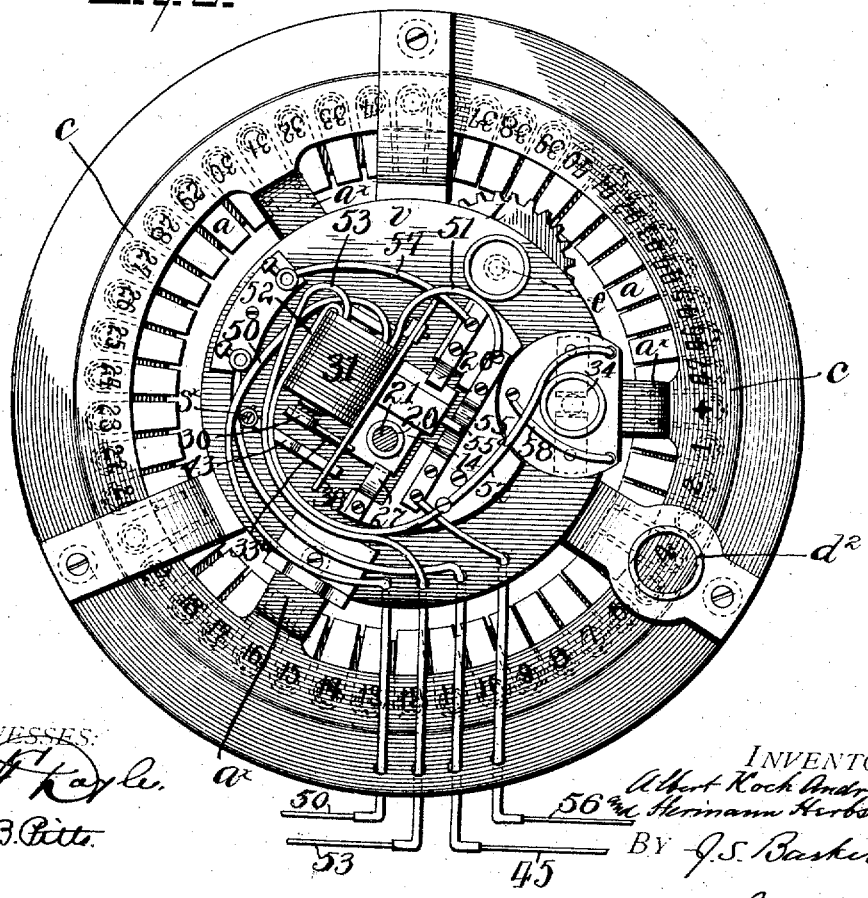
Figure 9:
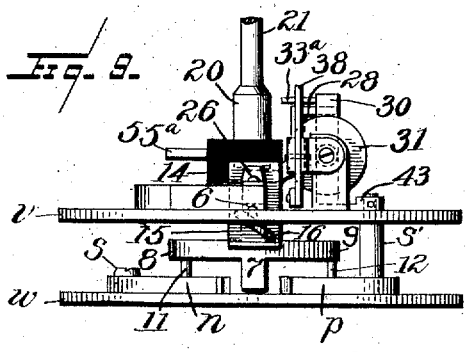
Figure 10:
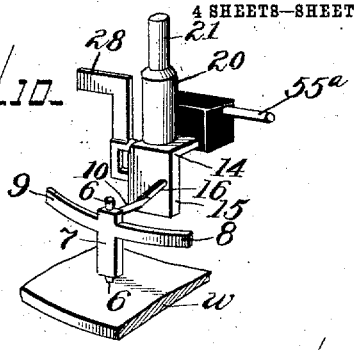
Figure 8:
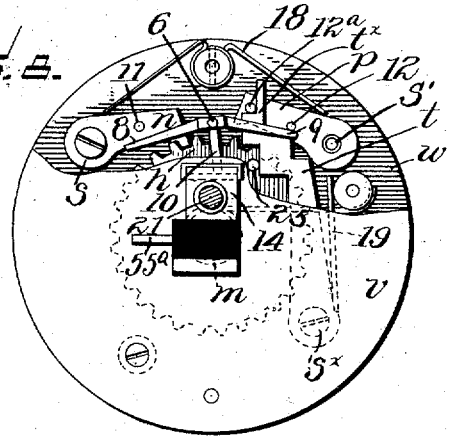
Figure 11:
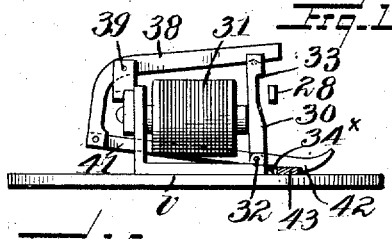
Figure 12:
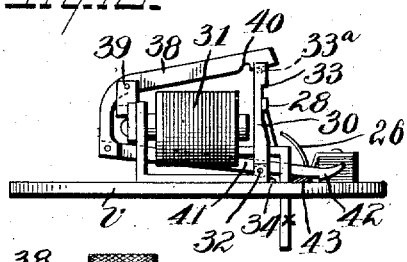
Figure 7:
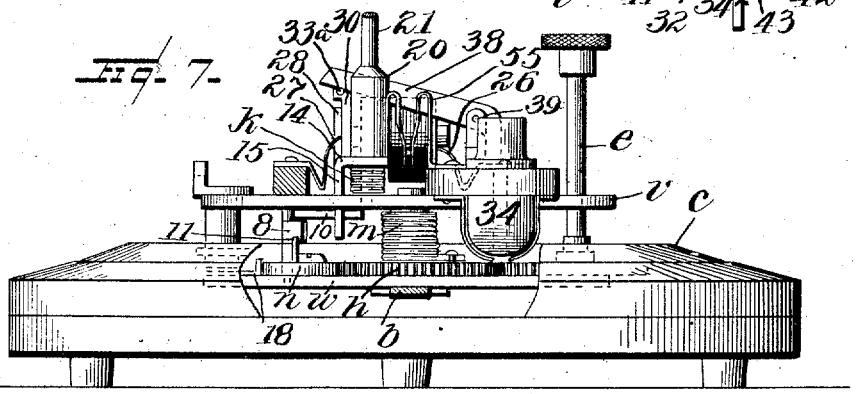
Figure 13:
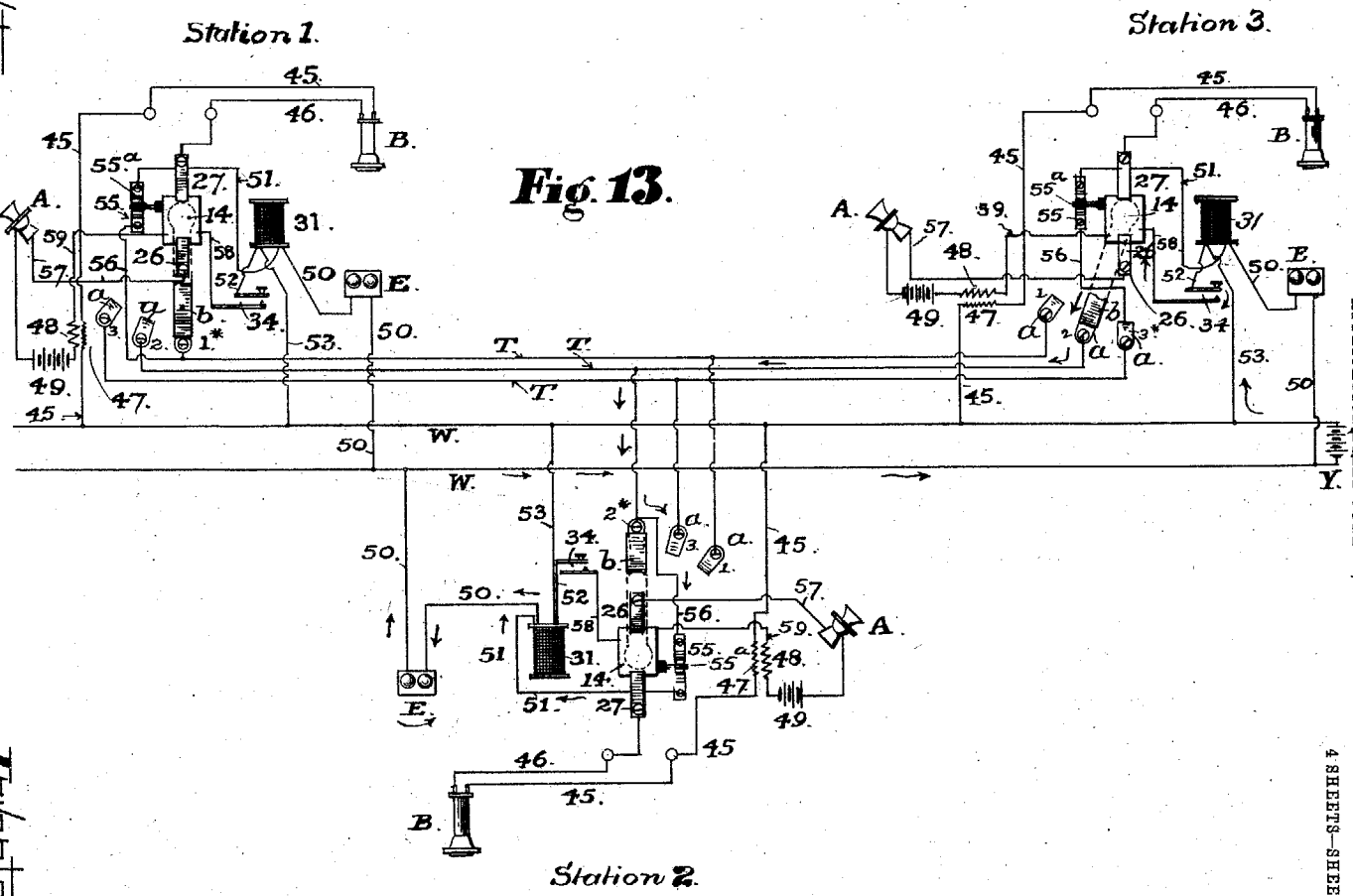

Figure 1 is an elevation of a desk-telephone embodying our invention and comprising a switch-stand and a support for the receiver and the transmitter. Fig. 2 is an elevation taken from the right side of Fig. 1 with the receiver on the hook and the transmitter removed, part of the frame or body of the instrument being broken away. Fig. 3 is a top view of the switching mechanism located in the base of the stand. Fig. 4 is a top view of the base-block, the stationary contacts, the movable contact, and the mechanism for setting and locking it. Fig. 5 is a top view, on an enlarged scale, of the mechanism removed from the base of the switch-stand. Fig. 6 is an elevation of Fig. 5 with the insulating-block, switch-dial, and frame in section. Fig. 7 is an elevation of Fig. 5 with the frame and switch-dial partly broken away to disclose parts inside. Fig. 8 is a top view of the parts pertaining to the locking mechanism, the top plate of the frame being partly broken away. Fig. 9 is an elevation of Fig. 8 with the addition of parts of the locking-out mechanism that are omitted from Fig. 8. Fig. 10 is a detail in perspective of the switch-piece and slide-plate of the locking mechanism. Figs. 11 and 12 are side elevations of the electromagnet and connected parts of the locking-out mechanism, Fig. 11 representing the relative position of the parts when a current has been passed through the magnet and the latter has attracted the locking-lever and Fig. 12 illustrating the normal position of the parts before the magnet has drawn away the locking-lever and the parts are in position to "lock out" the talking-circuit of the station. Fig. 13 is a diagrammatic representation of the circuits and connections between three stations.

The switching mechanism at each station contains a plurality of stationary contacts *a a*, corresponding in number with the stations in the system, and a movable arm *b*, carrying a contact through which the local circuit of the receiver and transmitter is connected with another selected station by setting the movable contact to the proper stationary contact of the switch. The arm $b$ of the switch is set to position by means of the setting-shaft $e$, geared into the arm by the spur-wheel $h$ on the shaft 2 on which the arm is fixed, and a pinion $i$, fast on the setting-shaft. The annular dial $c$ over the stationary contact is connected rigidly with the shaft 2 by arms $a^{\times}$ $a^{\times}$, so as to move uniformly with the arm $b$ and show by the switching-numbers on its face the position of the arm with reference to any selected contact $a$. When the number on the dial corresponding to the required station is exposed to view through the sight-opening $d^2$ in the stand, the arm $b$ will be in position upon the proper contact in the circle beneath the dial. In that position the arm $b$ is locked after the receiver is once taken down, and, on the other hand, the arm $b$ is released and set back to the "home" contact by the act of hanging up the receiver. The parts of the locking mechanism by which these two operations are effected by taking down and hanging up the receiver are shown in Figs. 7, 8, and 9.

The dog $n$, working on a pivot $s$, when set in contact with the teeth of the spur-gear $h$ acts to hold the gear from turning in either direction. A second pivoted dog $p$, mounted on an axle or pivot $s'$, prevents the gear from turning backward under the reaction of the coiled spring $m$ that returns the arm $b$ of the switch when the first-mentioned dog is set clear of the gear. The movable arm of the switch is thus held stationary when the dog $n$ is thrown into the gear, and it is also prevented from returning to the home contact of the station as long as the dog $p$ is set against the gear, while the dog $n$ is held away.

The spring 18 presses the two dogs $n$ $p$ against the teeth of the gear. When a switch is made to the line of another station, the locking-dog $n$ must be set away from the gear and only the dog $p$ allowed to act, and when the switch is to be thrown off after the talking is done the gear must be released by the dog $p$. These movements of the two dogs are effected automatically from the rising and falling movements of the arm of the telephone-hook through the following mechanism, the principal parts of which are the rocking switch-piece 7, the vertically-movable plate 14, and the push-rod 22, attached at the upper end to the arm 23 of the telephone-hook and its lower end bearing on the plate 14. On the switch-piece, which is set to turn loosely on the pivots 6 6, are two oppositely-diverging arms 8 9, extending over the dogs $n$ $p$ in position to engage stop-pins 11 12 on the dogs, so that the switch-piece rocking in one direction will press back one dog and in the other direction it will throw the other dog clear of the gear. A third arm or member 10 on the back of the switch-piece extending through an inclined slot 16 in the depending end 15 of the plate 14 connects that part with the switch-piece, and by virtue of the inclination of the slot with relation to the plane in which the plate 14 is caused to move the switch-piece is turned on its axis 6 6 in one direction by depressing the plate 14 and is brought back to position by the rising movement of the plate. A tubular guide 20 on the top of the plate 14 is fitted to slide on a fixed post 21 on the frame, and the lower end of the push-rod 22, fitting over the same post, rests on the top end of the tube 20, the upper end of the push-rod being loosely attached to the arm 23 of the telephone-hook at $22^a$. By virtue of this construction the weight of the receiver when that instrument is hanging on the hook depresses the plate 14, and by compressing a coiled spring $k$, interposed between the top plate of the frame and the piece 14, it holds the switch-piece 7 in such position that the dog $n$ is held away from the gear and only the dog $p$ will act; but on removing the receiver from the hook the coiled spring $k$ raises the plate 14 and the upward movement of that piece turns back the switch-piece and throws the locking-dog $n$ into the gear. The parts are so adjusted that the movable contact $b$ can be moved from point to point around the circle of contacts $a$ to make connection with another line as long as the receiver is left on the hook. In that position of the two dogs last mentioned, therefore, the movable contact $b$ can be moved off its home contact for switching to the line of another station.

In connection with the dog $p$, operating as before mentioned, provision is made for holding the dog out of the teeth of the gear in the return movement of the contact $b$ until the same has completed its throw back to the home contact; otherwise the gear $h$ would be caught and held by the dog $p$ as soon as the plate 14 was depressed and the switch-piece 7 moved by the act of hanging the receiver on the hook and before the movable contact $b$ had time to complete its return movement. The dog $p$ is controlled at such time therefore by a latch-piece comprising an arm $t$, pivoted at $s^{\times}$ on the frame and having a shoulder $t^{\times}$ on the free end, which by engaging a stop-pin $12^a$ on the dog $p$ in one position of the arm holds the dog $p$ away from the gear $h$, but when set away from the stop-pin it allows the dog to engage the gear. A spring 19 holds the latch $t$ in position to engage the stop $12^a$, and a stop 25 on the top face of the gear $h$ throws off the latch from the dog $p$ by striking and pressing back the latch as the movable contact $b$ completes its return movement. When thus released, the dog $p$ is in position ready to hold the gear from being turned back by the reaction of the spring $m$ when the contact $b$ is again moved to make a switch, while the other dog, $n$, is held away from the gear until the switch has been made and until the receiver is taken from its hook. The operation of these parts will be understood by reference to the details, Figs. 7, 8, 9, and 10.

The locking-out means by which an electrical connection and a closed circuit with another station is controlled through the operations of switching and ringing operates to hold the local or primary circuit of the station normally open or disconnected and to restore or put the circuit in condition for use by the act of pressing the ringing-key. This locking-out means is operated electrically through or over the line completed between the two stations through the switch and the ringing or calling circuit set up at such time between the two stations. It is controlled by and depends also for its operation, first, on the line between the two stations being clear, and, secondly, on the receiver being on the hook. This locking-out means comprises, first, circuit-closing contacts 26 27 in the transmitting and receiving circuit of the station arranged on opposite sides of the movable plate 14 and by contact with that part in its rising movement making a metallic connection and closing the local circuit at that point; secondly, an arm 28, carried by and projecting horizontally outward from the movable plate 14; thirdly, a locking-out lever 30, having a shoulder 33, that when set over and in line with the arm 28 will hold down the plate 14 by engaging that arm, and thereby prevent that part 14 from touching the contacts 26 27, and, fourthly, an electromagnet 31, having its windings connected in the main line and the ringing-circuit. The magnet 31 is a single spool with double windings constituting two separate coils, one of which is connected through the wires 52 53 in the line-wire that forms one side of the circuit completed for talking between two stations, while the other coil is connected by the wires 50 51 into the bell-circuit. The arm 28 is secured to the movable plate 14, and the locking-out lever 30 is pivoted at 32 in close relation to the pole of the magnet 31, to which it is attracted when a current is passed through the magnet. A spring $34^{\times}$ on the pivot of the lever holds that part normally away from the pole of the magnet. Such is the position of the parts as long as the receiver is left on the hook; but on removing it before the magnet has attracted the lever 30 the arm 28 will be caught by the shoulder 33, and being unable to rise higher than that point the movable plate 14 cannot touch the contacts 26 27, and the circuit will remain broken or open at these contacts. By passing a current through the magnet 31, however, the locking-out lever 30 is drawn out of line with the arm 28, thus allowing the plate 14 to rise to its full extent and touch the contacts 26 27. A circuit through the magnet is completed when the ringing-key 34 is pressed to call the station at the other end of the line, so that the magnets 31 at both stations will be energized, and the contacts 26 27 at both stations will be closed when the receivers are taken from the hook, thus putting the circuits of both stations in operative condition by the act of calling up one station from the other over the ringing-circuit. As before stated, these conditions require the receiving instrument at the called station to be at rest on the telephone-hook and the station to be disconnected from the line of any other station, for should the conditions be otherwise than those mentioned the magnet 31 cannot be energized, because it can get no current from the battery Y, and the locking-out lever 30 will remain in operative position.

When one station is properly connected with another station through the switch, a calling-circuit will be completed over that one of the lines T which connects the two stations at the time and through the bell at the called station and the battery Y on the ringing-circuit and the ringing-key at the calling-station. The bell at the called station will ring then at the moment that the circuit is closed at the ringing-key 34 of the calling-station, and at the same time the current will pass through that coil of the magnet at the calling-station which is connected directly to the line-wire W, running to the battery Y. At the opposite station, on the other hand, the current will pass through that one of the coils of its magnet 31 which is connected into the line W through the bell E, because the remaining coil of the magnet at the called station which is connected into the lines T through the frame and the switch is disconnected from the circuit at the ringing-key 34. The circuit completed at such time will be traced from the diagram Fig. 13, as follows: Starting from the back-stop of the ringing-key 34 at station No. 3 the circuit is carried over the wire 58 to the frame of the instrument, thence through the movable contact *b*, which has been placed on the contact 2, that forms the terminal of the line connecting with station No. 2, and thence out over the line to the home contact at station No. 2, where the movable contact is standing in its normal position of rest. At that point the circuit is carried by wires and connections 56, 51, and 50 to one side of the line W, running to the ringing-battery, and thence through that battery Y and into station No. 3 over the wires and connections 53 52 at that station, where the circuit is completed when the front stop of the key 34 touches the back-stop. It will be seen that this circuit carries the current through that one of the coils of the magnet which is connected at station No. 2 into the conductors 51 50 between the bell E and the switch-contacts. At the calling-station No. 3, on the contrary, the current passes through that coil of the magnet which at that station is connected directly into the ringing-battery line by the conductor 53 and to the front stop of the ringing-key 34 by the connection 52. At the instant that it is attracted by its magnet the lever 30 is caught and is held back by a catch 38, loosely pivoted at 39 at the back of the magnet and having a notch 40, that catches a pin 33ª on the lever 30 as the catch 38 drops. The function of this catch is to hold back the locking-out lever 30 after the current ceases to act on the magnet and prevent the lever from moving back before the arm 28 has had time to clear the shoulder 33.

The outer end of the catch 38 extends over and lies in the path of the arm 28, so as to be struck and thrown off the pin 33ª by the upward movement of the arm 28 as that part is elevated by the movable plate 14.

Another means actuated from the movement of the locking-dog *p* is also provided for throwing off the catch at the proper time, so that the locking-out lever shall be released and caused to act with certainty if any attempt be made to move the switch *b* of a station over its switch-points *a* to get on another line already in use after the locking-out lever at the station has once been attracted by the magnet and before the switch *b* has been returned to its normal position by hanging up the receiver. This additional means consists of a draw-rod 41, attached to the curved end of the catch 38 and having on the front end a hook 42, which by engaging an arm 43 on the axle or pivot *s'* of the dog *p* is drawn forward as the dog is moved.

Bearings for the pivots *s*, *s'*, and *s*ˣ are provided in the frame *w w*, and the arm 43 on the end of the pivot *s'* lies closely to the top plate *w*.

Provision is made for opening the ringing-circuit to cut out the bell after connection has been made and the line is in condition for talking. This is effected in the well-known manner through the medium of contact-springs 55, placed in the conductors 51 56, and a circuit-closing piece 55ª, carried by the movable plate 14 and insulated from it. As long as the latter is held down by the weight of the receiver on the hook the pin 55ª connects the two springs 55 and holds the bell-circuit closed at that point; but on taking down the receiver for use the plate 14 rises and opening the circuit at the point 55 cuts out the bell.

In operating this switching mechanism it is necessary to set the switch to the desired station before taking the receiver from the hook, because the gear *h* of the setting mechanism is locked and cannot be moved either forward or backward after the receiver is removed, and after the plate 14 is relieved of the weight of the receiver and allowed to rise it is held away from the contacts 26 27 and cannot act to close the circuit unless the battery-current can act on the magnets. If the station being called is not already in use, the same current that rings the bell also energizes both magnets, as already explained; but should the station be in use at the time there will be no circuit through the bell nor through the magnets 31, because the ringing-circuit is opened whenever the receiver is taken down for use.

Should a party at any station after having set his switch to the line of another station already in use take his receiver from its hook in an attempt to listen on the line, the movable plate 14 will be caught by the locking-out lever 30 before it touches the contacts 26 27 in the talking-circuit. At such time also the movable arm *b* of the switch will be held by the dog *n*, which comes into play as soon as the plate 14 rises, and the switch *b* cannot be moved until the receiver is returned to the hook.

The talking-circuit between two stations, as stations Nos. 2 and 3 in the diagram, will be traced as follows: At station No. 3, as well as at the opposite station No. 2, connected through the switches *b* and the line, as already described, the local or primary circuit is completed from one side of the battery 49, the transmitter A, and the connection 57 to the contact 26 and thence through the frame, the connection 59, and the primary 48 of the induction-coil into the opposite side of the battery, the circuit being completed as soon as the receiver is taken down. Starting from the induction-coil at station No. 3 the circuit connecting the two stations and including the two receivers and both induction-coils is carried from the secondary 47 through the connections 45 46 of the receiver B and the contact 27 and thence to the arm *b* of the switch, which is in metallic contact or connection with the plate 14, and through the switch and out over the line T, running to the other station. If the switch *b* at that station be standing on its home contact, the circuit is carried through that part and the frame to the plate 14 and thence through the contact 27, the conductors 46 45, and the receiver *b* to the secondary 47 of the induction-coil at station No. 2. As the secondaries of all the coils are connected to a common line W, for which one of the line-wires of the ringing-battery is employed, it will be seen that the circuit between the two stations is finally completed over the wires 45 and the line W. These conditions obtain only when the switches *b* at both stations are in their proper positions and the plate 14 is allowed to rise.

Referring to the operation of the plate 14, it will be obvious that it must have a sufficient extent of downward movement to act on the switch-piece 7 when it is arrested by the lever 30 and prevented from rising to its highest point, as well as when it is allowed to rise and touch the contacts 26 27. Some means also is required to hold back the lever 30 after the magnet ceases to act, because the party at the calling-station would otherwise be compelled to hold down his ringing-key until the receivers at both stations are removed from their hooks.

Having thus fully described our invention, what we claim as new therein, and desire to secure by Letters Patent, is—

1. A switching mechanism for telephones comprising a plurality of stationary line-contacts, a movable contact adapted to be set in operative relation to a selected one of the line-contacts, a spring to return said movable contact to its normal position, a detent to hold the movable contact in position against the reactive force of the spring, and a locking device controlled by the telephone-hook and operating to prevent the movable contact from being moved off the selected line-contact after the receiver is removed from the hook.

2. In a switching mechanism for telephones, the combination with a plurality of line-contacts and a movable contact adapted to connect the subscriber's talking-circuit with a given line through the selected line-contact; of a locking device controlling the movable contact and itself actuated by the telephone-hook to lock the movable contact when the receiver is removed from the hook and to prevent the movable contact from being moved out of position until the receiver is replaced on its hook.

3. The combination, with a telephone switching mechanism having a plurality of stationary contacts and a movable contact; of a locking device adapted to lock the movable contact and prevent it from being moved in either direction after the receiver is removed from the telephone-hook, and to release the movable contact when the receiver is replaced.

4. In combination, a plurality of line-contacts, a movable contact connecting the subscriber's talking-circuit with a selected one of the line-contacts, a spring to restore the movable contact to position, a detent to hold the movable contact against the reactive force of the spring, a locking device operating when brought into action to prevent the movable contact from being moved off the line to which it has been switched, and means controlled by the telephone-hook to throw the locking device into or out of operation by the act of taking down or of hanging up the receiver.

5. In combination, a local talking-circuit, a circuit-closer controlling the connection thereof with a common talking-line, means for holding out of action said circuit-closer, an electromagnet in circuit with a battery, means operated by said magnet to throw the circuit-closer into action, and a circuit-closer in the battery-circuit adapted to release the holding-out means of the circuit-closer in the talking-circuit by closing the battery-circuit through the magnet and through the common talking-line between two connected telephones.

6. In a telephone system, the combination in and with a plurality of stations, of a common talking-line, a common ringing-circuit including a battery and a signal at each station, individual receiving and transmitting circuits connectible with the common talking-line through a circuit-closer and switching mechanism at the station, a lock-out device controlling said circuit-closer at each station and normally holding the same out of action, an electromagnet connected with the common ringing-circuit through the talking-line and adapted to be energized when the talking-line is closed between one station and the other through the switch and the ringing-circuit is closed at either station, and means whereby the magnets in both connected stations are caused when energized from either station to throw off the locking devices in both stations and release the circuit-closers in the talking-circuit.

7. In a lock-out mechanism for telephone systems the combination of a common talking-line, an individual receiving and transmitting instrument in a local circuit connectible through a switch and a "home contact" with a plurality of similar stations, a circuit-closing device in the local circuit, a locking device holding said circuit normally open, a battery and an electromagnet in circuit therewith through a circuit-closing key and with the common talking-line between the stations through the individual "home contact" of each station, means operated by the magnet when the circuit is closed between two connected stations to actuate the locking device and release the circuit-closer controlled by it, a catch holding the locking device in operative position when the battery is taken off the magnet, and means releasing the catch by the act of hanging up the receiver.

8. In a lock-out mechanism for telephone systems, a circuit-closing device at each station controlling the connection between the local receiving and transmitting circuit and a common talking-line, a switch adapted to give connection at each station with any selected station of the system, a locking-lever adapted to hold the circuit normally open, an electromagnet having connection with a common signaling-circuit including a battery by which all the stations comprising the system are interconnected, said magnet being adapted when energized to throw off the locking-lever, a push-button at each station for closing the battery from that station upon the magnet of a connected station through the switch of that station, a catch adapted to hold the locking-lever out of action, and a releasing device operative under the movements of the local switch to throw off the catch when the contact-arm of the switch is moved off the stationary contact.

9. In combination, a plurality of stations, a common talking-line, a switching mechanism and circuit-closer at each station connecting the individual receiving and transmitting circuits thereof with any selected one of the other stations through the talking-line, a lock-out device normally holding said circuit-closer out of action, a signaling-circuit common to all the stations in which is included a battery and a circuit-closing device at each station, and electrically-operative means controlling the line-circuit closers and adapted to release the same at the stations connected through the common talking-line when the signaling-circuit is closed at either of the connected stations, and to isolate the circuit-closers of all the remaining stations from the common talking-line when two connected stations are using the line.

In testimony that we claim the foregoing we have hereunto set our hands and seals.

ALBERT KOCH ANDRIANO. [L. S.]
HERMANN HERBSTRITT. [L. S.]

Witnesses as to signature of Albert Koch Andriano:

EDWARD E. OSBORN,
M. REGNER.

Witnesses as to signature of Hermann Herbstritt:

JOHN A. SHORES,
MRS. L. DUFF.